United States Patent [19]
Sydnor, Jr. et al.

[11] 3,745,387
[45] July 10, 1973

[54] MOUNTING STRUCTURE FOR A SUBMERGED MOTOR

[75] Inventors: Garland S. Sydnor, Jr.; Robert C. Dively, both of Richmond, Va.

[73] Assignee: Sydnor Hydrodynamics Inc., Richmond, Va.

[22] Filed: Feb. 24, 1971

[21] Appl. No.: 117,921

[52] U.S. Cl. .................... 310/51, 310/157, 261/36
[51] Int. Cl. ............................................. H02k 5/24
[58] Field of Search ................... 310/68, 66, 51, 87, 310/91, 157; 261/91, 93, 36

[56] References Cited
UNITED STATES PATENTS

| | | | |
|---|---|---|---|
| 3,497,185 | 2/1970 | Dively | 261/36 |
| 3,531,667 | 9/1970 | Barton | 310/51 |
| 3,584,469 | 6/1971 | Butts | 310/51 |
| 3,416,729 | 12/1968 | Ravitts | 261/36 |
| 3,523,203 | 8/1970 | Whitney | 310/157 |
| 3,465,182 | 9/1969 | Church | 310/51 |

*Primary Examiner*—R. Skudy
*Attorney*—Low & Matthews

[57] ABSTRACT

A mounting structure for a submerged motor wherein vibrations of the motor are isolated from an external supporting frame. The motor is suspended beneath at least one float member which is attached to a shroud used to direct cooling water over the exterior surface of the motor. Vibration damping means are provided between the shroud and the motor. The vibration damping means are secured to a plurality of vertically extending bars located between the shroud and the motor. The bars are spaced at regular intervals around the periphery of the motor and serve with the vibration damping means to provide vanes which prevent the formation of a vortex.

12 Claims, 7 Drawing Figures

PATENTED JUL 10 1973  3,745,387

INVENTOR.
Garland S. Sydnor, Jr
BY Robert C. Dively
Low & Matthews
ATTORNEYS

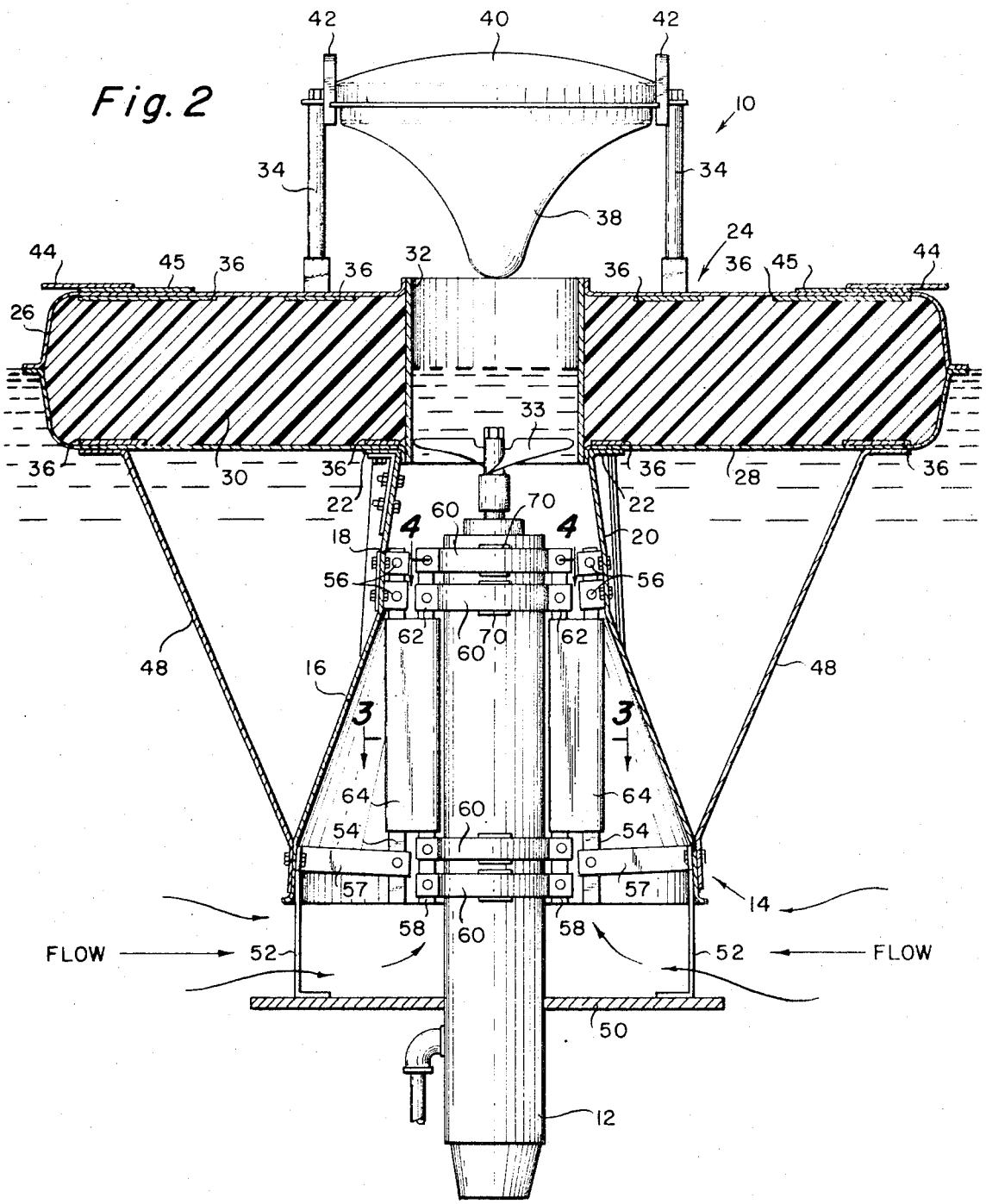

MOUNTING STRUCTURE FOR A SUBMERGED MOTOR

This invention relates to a mounting structure for a submerged motor, and more particularly, to a mounting structure which isolates vibrations from a submerged motor and its external supporting frame.

Submerged motors are commonly employed in sewage and industrial waste treatment systems such as is disclosed in an aerating and cooling apparatus in U.S. Pat. No. 3,497,185, issued on Feb. 24, 1970, to the common assignee of the present invention. It sometimes occurs that the motor or propeller driven by the motor becomes damaged in the course of its normal usage whereby severe stresses and strains are placed upon the motor and its supporting frame assembly. For example, one very common experience is for a Propeller blade to be deformed or broken by some debris in the pond in which the aerating and cooling apparatus is functioning. This establishes an extremely unbalanced condition which can result in severe damage to the entire unit in that because of resonating vibrations it literally shakes itself to pieces.

In accordance with the present invention a mounting structure is provided which substantially isolates the motor from its external supporting frame. The motor is submerged in a liquid and suspended beneath at least one float member. The latter is attached to a shroud means which directs cooling water over the exterior surface of the motor. The shroud means which encircles and is spaced from the motor is open at both ends and carries a plurality of vertically extending bar means which are paired with vertically extending bar means mounted exteriorly and circumferentially with respect to the motor. The paired bar means have a vibration damping member secured thereto which is loaded in shear. Preferably, the vibration damping member is a rubber-like material such as Neoprene. In this manner, vibrations of the motor are substantially isolated from the external supporting structure.

The vertically extending bar means associated with the motor, are supported by upper and lower pairs of segmental compression bracket members which are further provided With elastic friction clamping means between the brackets and the motor. Preferably, this elastic friction clamping means comprises elastic pads mounted substantially centrally of the segmental bracket members to permit deflection of the segmental bracket members as the elastic pads are compressed.

The inherent advantages and improvements of the present invention will become more readily apparent upon considering the following detailed description of the invention and by reference to the drawings in which:

FIG. 2 is a vertical elevational view of the apparatus shown in FIG. 1;

Figure 1:
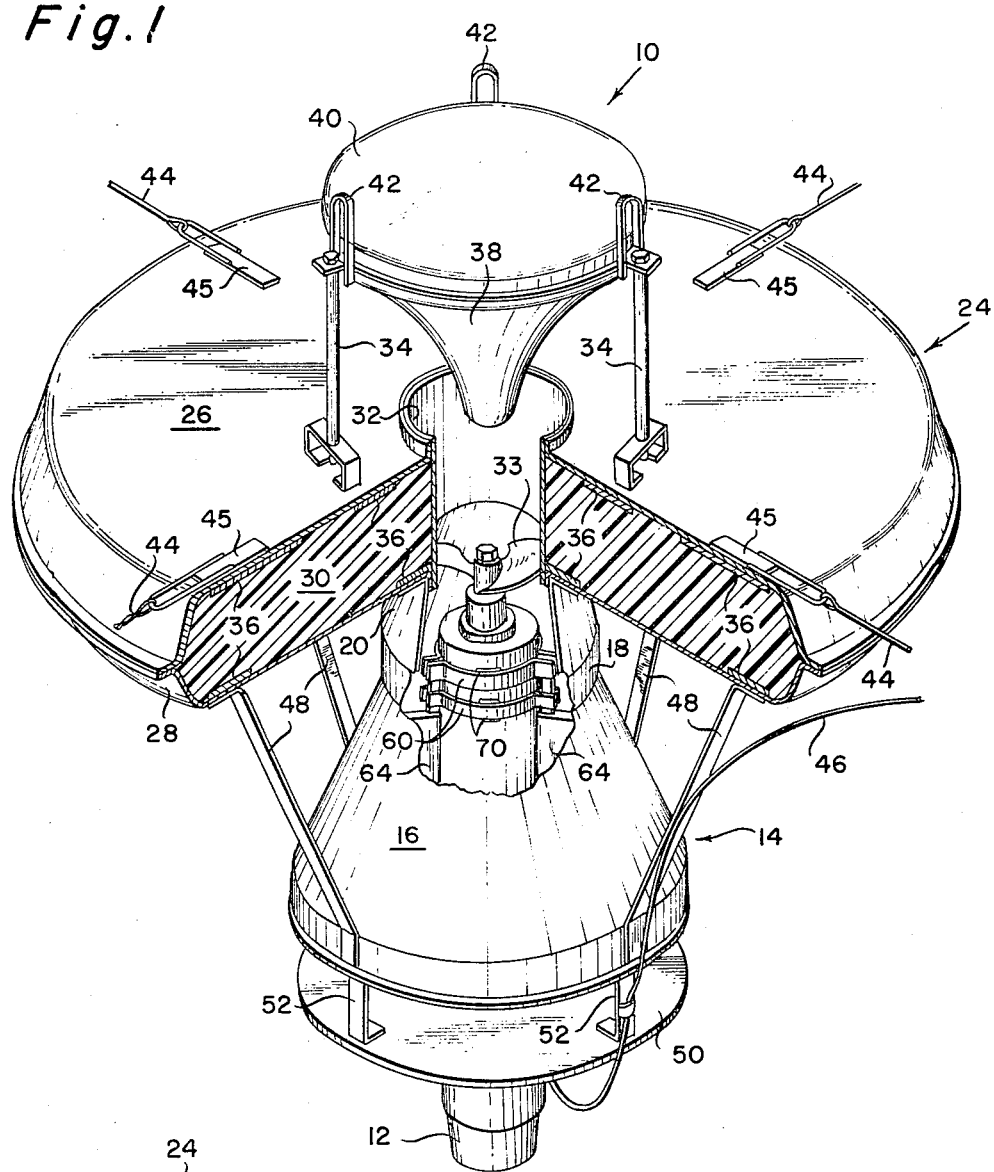
FIG. 1 is a perspective view of an aerating apparatus made in accordance with the present invention.

Referring now to FIGS. 1 and 2, there is shown an aerating apparatus, indicated generally at 10. The aerating apparatus 10 comprises a motor 12 which is mounted within a shroud means indicated generally at 14. Shroud means 14 has a substantially frusto-conical portion 16 which surrounds and is spaced from motor 12 and further has a substantially cylindrical portion 18 and necked in portion 20 seen best in FIG. 2. The shroud means 14 is open at both ends so as to admit water from the pond in which the aerating apparatus is moored to pass over and cool motor 12.

The upper portion of the shroud means 14 is flanged at 22 so that it may be secured to a float member which is indicated generally at 24. The float member 24 comprises an upper plate 26 and lower plate 28 which have been formed so as to provide an encasement for a plastic filler 30 which is preferably foamed polyurethane or other plastic material. A discharge tube 32 is mounted substantially in line with the upper end of shroud means 14 and further completes the encasement of the plastic filler 30 of float member 24. The motor 12 drives a propeller 33 which draws water in from the pond and then vertically upwardly over motor 12 to cool it.

Mounted atop the float member 24 by means of mounting brackets 34 which are attached to associated reinforcing plates 36 is a deflector member 38 which serves to deflect water passing over the motor 12 and past propeller 33 radially outwardly. This action aerates the water thereby supplying additional oxygen to the pond whereby rapid oxidation of the refuse in the pond may be effected. It is possible to dispense with the deflector member 38 where it is desired to effect merely a cooling of the water within the pond. The deflector member 38 has an associated cover member 40.

Figure 7:
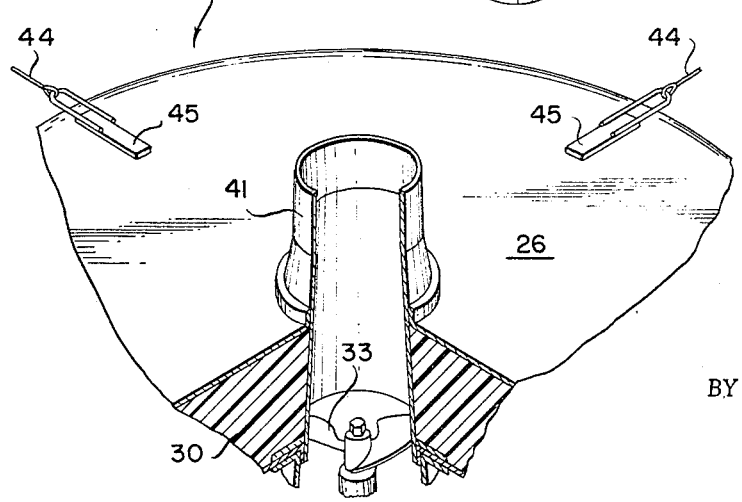
FIG. 7 is a fragmentary perspective view similar to FIG. 1 showing a nozzle construction suitable for cooling water.
Figure 3:
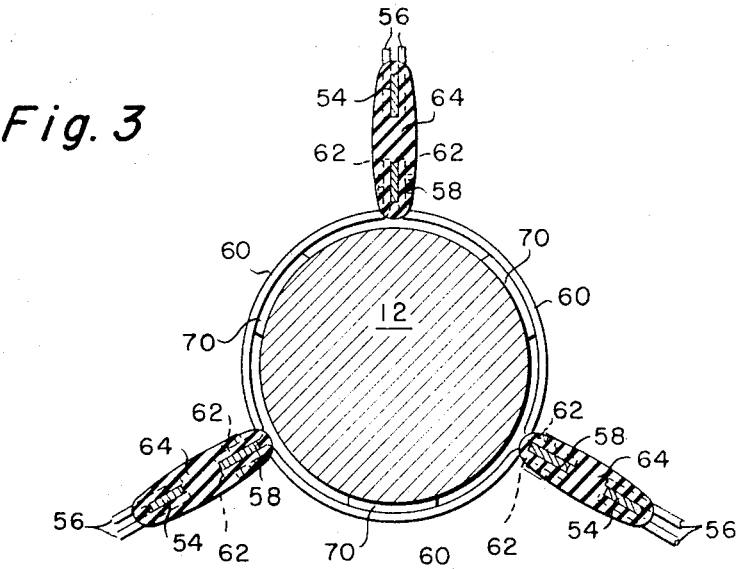
FIG. 3 is a plan view taken in horizontal cross section along line 3—3 of FIG. 2.

The subject invention is also useful in connection with the cooling of fluids, such as water or the like. In such instances, a nozzle 41 is mounted atop upper plate 26 as shown in FIG. 7 in place of the deflector member 38 and associated supporting members. When used as a cooling unit, the fluid is propelled vertically upwardly into the air in order to cool it.

In order to lift and thereby position the aerating apparatus 10 of FIGS. 1 and 2, lifting eyes 42 are provided associated with each of the mounting brackets 34. For purposes of positioning and anchoring the aerating apparatus, there is provided a series of mooring cables 44 each attached to mooring brackets 45 which in turn are secured to the float member with the aid of additional reinforcing plates 36. Electric power is supplied to motor 12 from the shore through power conductors such as is indicated at 46 in FIG. 1.

A plurality of float support arms 48 are attached to the float member 24 with the aid of additional reinforcing plates 36 and interconnect the float member with the shroud means 14. A suitable anti-erosion disc 50 is mounted beneath the shroud means 14 by means of a series of support arms 52 whereby the liquid from the pond is drawn in laterally from beneath the lower portion of the substantially frusto-conical shroud means 14. This lateral drawing in of the water is indicated by the arrows in FIG. 2. By drawing water into the aerating apparatus laterally rather than vertically, severe pitting of the pond beneath the aerating apparatus is avoided.

Figure 5:
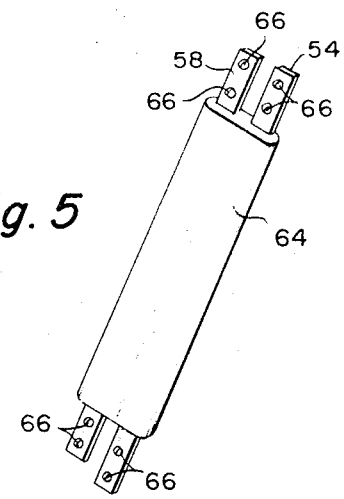
FIG. 5 is a perspective view of a vibrating damping member and associated vertical bar means.

In order to isolate vibrations of the motor from the external supporting structure, a series of vertical rods 54 are carried by shroud means 14 by means of upper bracket members 56 and lower mounting brackets 57. Paired with the vertical bars 54 are vertical bars 58 carried by motor 12 by means of segmental compression bracket members 60. Each end of an individual segmental compression bracket member 60 is flanged at 62 in order to secure it to an adjacent segmental bracket member 60 and allow compression of elastic friction clamping member 70. A vibrating damping member 64 is secured to each of the paired vertical bar means 54, 58 such as by being vulcanized thereto. The vibration damping means is preferably made of Neoprene material of a durometer dependent upon the size of the aerating unit. The vibration damping member 64 is loaded in shear. Each vertical bar member 54 and 58 is provided with apertures such as is shown at 66 in FIG. 5 so as to receive suitable bolt and nut assemblies 68 to interconnect adjacent segmental compression bracket members 60. Preferably, the assembly shown in FIG. 5 of the vertical bars 54 and 58 and vibration damping member 64 is formed as a unit with the vibration damping member being vulcanized to the vertical bars in a suitable mold.

Figure 4:
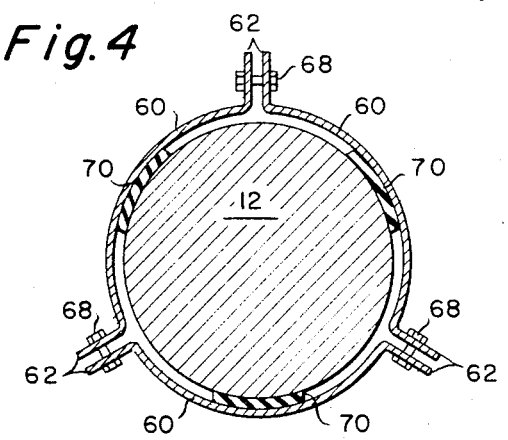
FIG. 4 is a plan view taken in horizontal cross section along line 4—4 of FIG. 2.
Figure 6:
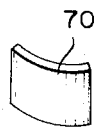
FIG. 6 is a perspective view of an additional vibration damping means shown in FIG. 4.

As is shown in FIG. 4, an elastic friction clamping member 70 is placed between each segmental compression bracket member 60 and the motor 12 preferably substantially centrally of an individual segmental compression bracket member 60.

By way of example, the Neoprene vibration damping means 64 having a durometer of 60 may be used in connection with a 30 H.P. aerator 10 whose motor 12 weighs approximately 600 pounds and whose exterior frame, including the shroud 14 and float member 24, also weigh about 600 pounds. A cross section of the vibration damping means is approximately 1 inch × 1 inch × 18 inches long. For a 20 H.P. aeration unit, a Neoprene vibration damping means 64 having a durometer of 40 may be utilized. In each instance, the Neoprene is loaded to about 25 pounds per square inch. The moment of inertia for the aforesaid 30 H.P. unit is approximately 19 lb.-in-sec$^2$ and the moment of inertia for the external structure is approximately 620 lb.-in-sec$^2$. It is anticipated that the average pH of the liquid within which the aerator is moored will be about 5 with an expected range of from about 3 to about 10. Neoprene is a preferred material because of its aging and memory characteristics. A minimum life of 10 years is expected. The rods 54 and 58 to which the Neoprene vibration damping means is vulcanized are preferably carton steel, but may be stainless steel or other suitable material.

While float member 24 is shown to be a single member, it may be made from a plurality of floats, if desired. Shroud means 14 may also be substantially cylindrical as shown in U.S. Pat. No. 3,497,185.

While a presently preferred embodiment of the invention has been illustrated and described, it will be recognized that the invention may be otherwise variously embodied and practiced within the scope of the claims which follow.

What is claimed is:

1. A mounting structure for a submerged motor comprising
   a. a motor submerged in a liquid,
   b. shroud means encircling and spaced from said motor and having opposed ends open,
   c. vibration damping means between said shroud and said motor to isolate vibrations therebetween,
   d. support means to support said motor and said shroud means,
   e. said support means including at least one float member,
   f. said shroud means carrying a plurality of vertically extending bar means and said motor carrying a plurality of vertically extending bar means paired with said bar means carried by said shroud,
   g. and wherein said vibration damping means is secured to said paired bar means and envelops a substantial portion of said paired bar means so as to be loaded in shear.

2. A mounting structure for a submerged motor as defined in claim 1 wherein said shroud means is substantially frustoconical in cross section.

3. A mounting structure for a submerged motor as defined in claim 1 including a propeller driven by said motor, and wherein said vibration damping means secured to said plurality of paired bar means form vanes exteriorly of said motor and serve to prevent a vortex when said motor drives said propeller.

4. A mounting structure for a submerged motor as defined in claim 1 wherein said shroud means directs said liquid over said motor to cool said motor.

5. A mounting structure for a submerged motor as defined in claim 2 including means for drawing water in laterally from beneath the lower portion of said frusto-conical shroud means.

6. A mounting structure for a submerged motor as defined in claim 1 wherein said plurality of vertically extending bar means carried by said motor includes upper and lower segmental compression bracket members and elastic friction clamping means between said segmental compression bracket members and said motor.

7. A mounting structure for a submerged motor as defined in claim 6 wherein said elastic friction clamping means is positioned substantially centrally of said segmental compression bracket members.

8. A mounting structure for a submerged motor as defined in claim 6 wherein said shroud means is substantially frusto-conical in cross section.

9. A mounting structure for a submerged motor as defined in claim 6 wherein said shroud means directs said liquid over said motor to cool said motor.

10. A mounting structure for a submerged motor comprising
    a. a motor submerged in a liquid,
    b. shroud means encircling and spaced from said motor and having opposed ends open,
    c. vibration damping means between said shroud and said motor to isolate vibrations therebetween,
    d. support means to support said motor and said shroud means,
    e. said support means including at least one float member,
    f. said shroud means carrying a plurality of vertically extending bar means and said motor carrying a plurality of vertically extending bar means paired with said bar means carried by said shroud,
    g. a propeller driven by said motor,
    h. and said vibration damping means are secured to said plurality of paired bar means to form vanes exteriorly of said motor which serve to prevent a vortex from forming when said motor drives said propeller.

11. A mounting structure for a submerged motor as defined in claim 10 wherein said shroud means is substantially frustoconical in cross section.

12. A mounting structure for a submerged motor as defined in claim 10 wherein said shroud means directs said liquid over said motor to cool said motor.

* * * * *